United States Patent
Hamilton et al.

(10) Patent No.: US 7,022,634 B2
(45) Date of Patent: Apr. 4, 2006

(54) LOW BORON E-GLASS COMPOSITION

(75) Inventors: James Patrick Hamilton, Parker, CO (US); Harry Hand Russell, III, Evergreen, CO (US)

(73) Assignee: Johns Manville, Denver, CO (US)

( * ) Notice: Subject to any disclaimer, the term of this patent is extended or adjusted under 35 U.S.C. 154(b) by 207 days.

(21) Appl. No.: 10/613,939

(22) Filed: Jul. 7, 2003

(65) Prior Publication Data

US 2005/0009683 A1  Jan. 13, 2005

(51) Int. Cl.
C03C 3/091    (2006.01)
C03C 3/087    (2006.01)
C03C 13/06    (2006.01)
C03C 13/00    (2006.01)

(52) U.S. Cl. .............. 501/66; 501/35; 501/36; 501/70

(58) Field of Classification Search ............ 501/35, 501/36, 66–70
See application file for complete search history.

(56) References Cited

U.S. PATENT DOCUMENTS

| 3,095,311 A | 6/1963 | Wranau et al. |
| 4,166,747 A | 9/1979 | Neely, Jr. |
| 4,562,161 A * | 12/1985 | Mennemann et al. ......... 501/59 |
| 4,771,019 A | 9/1988 | Sproull |
| 5,910,461 A * | 6/1999 | Gasca et al. .................. 501/35 |
| 6,686,304 B1 * | 2/2004 | Wallenberger ............... 501/35 |
| 6,818,575 B1 * | 11/2004 | Wallenberger ............... 501/35 |

FOREIGN PATENT DOCUMENTS

| FR | 2650268 | 2/1991 |
| FR | 2692248 A1 * | 12/1993 |
| JP | 62162649 A * | 7/1987 |
| RU | 2027687 | 1/1995 |
| WO | 99/01393 | 1/1999 |
| WO | WO 00/73231 A1 | 12/2000 |
| WO | WO 01/32576 A1 | 5/2001 |

* cited by examiner

Primary Examiner—Karl Group
Assistant Examiner—Elizabeth A. Bolden
(74) Attorney, Agent, or Firm—Robert D. Touslee

(57) ABSTRACT

Provided is a glass composition useful in preparing fiberglass, with the composition comprising $SiO_2$ in an amount ranging from 52–62 weight percent: $B_2O_3$ in an amount ranging from 3.5–5.5 weight percent; CaO in an amount ranging from 18–25 weight percent; MgO in an amount ranging from 0.5–4 weight percent; $Al_2O_3$ in an amount ranging from 10–15 weight percent; and $Na_2O$ in an amount ranging from 0.25–2 weight percent. The glass composition has an HTV of no greater than 2300° F. and a liquidus temperature at least 150 ° F. less than the HTV temperature. The composition allows one to realize costs savings associated with lower batch costs and abatement requirements, without significantly increasing the energy required for melting the glass, reducing fiberization efficiency, or requiring the development of new bushing technology.

16 Claims, No Drawings

LOW BORON E-GLASS COMPOSITION

BACKGROUND OF THE INVENTION

1. Field of the Invention

The present invention relates to a low boron containing E-glass composition. More specifically, the present invention relates to a glass composition which comprises a small amount of boron, and still maintains fiberization capability.

2. Description of the Related Art

For many years, the industry has prepared fiberglass and fiberglass products with a base glass composition of the "E-glass" type. "E" glass is generally described in U.S. Pat. No. 2,344,961, and the described glasses are typified by the composition listed below (with the constituents being in weight percent):

| | |
|---|---|
| $SiO_2$ | 52–56% |
| $Al_2O_3$ | 12–16% |
| CaO | 16–19% |
| MgO | 3–6% |
| $B_2O_3$ | 9–11% |

U.S. Pat. No. 2,571,074 describes a "modified E" glass, which is typically devoid of MgO, and with the CaO content much higher than a typical "E" glass. In general, the glasses have a composition as shown below (the percentages being weight percent):

| | |
|---|---|
| $SiO_2$ | 52–56% |
| $Al_2O_3$ | 12–16% |
| CaO | 19–25% |
| $B_2O_3$ | 8–13% |

U.S. Pat. No. 4,166,747 describes an E glass which attempts to lower the $B_2O_3$ content in the glass used to manufacture glass fibers in order to achieve reductions in batch costs. To compensate, the glass composition used has only a small quantity of MgO. In general, the glass has a composition as shown below (the percentages being in weight percent):

| | |
|---|---|
| $SiO_2$ | 54–55%, more preferably 54.2–55% |
| $Al_2O_3$ | 13–14% |
| CaO | 22–24%, more preferably 22.1–23.2% |
| MgO | 0.2–0.5%, more preferably 0.3–0.4% |
| $B_2O_3$ | 5.5–6.8%, more preferably 6.5–6.8% |

Thus, typical E-glass compositions used in the industry generally contained approximately 6% or more $B_2O_3$. As a result of this level of $B_2O_3$, abatement of E-glass furnaces is required to reduce particulate emissions into the environment. As a result of the challenging economics, and environmental issues, E-glass type fibers have been proposed that contain little or no $B_2O_3$, i.e., see, for example, WO 00/73231; WO 01/32576; U.S. Pat. Nos. 6,136,735 and 5,789,329. Benefits are claimed associated with lower abatement costs and lower batch costs due to boron-free base glass formulations.

The elimination of $B_2O_3$ in the base glass compositions, however, has resulted in increases in the high temperature viscosity (HTV) and liquidus temperature relative to standard E-glass containing 6% or more $B_2O_3$. HTV is the temperature at which the glass melt has a viscosity of 1000 poises. In the production of fiberglass, the glass melt in the bushing is typically maintained at 50–100° F. above the HTV for optimum fiberization efficiency. A glass composition with a higher HTV requires more energy to achieve this viscosity and therefore, incurs higher energy costs. The liquidus temperature is the highest temperature at which devitrification (crystallization) of the glass melt occurs. In fiberglass production, it is greatly preferred that the glass melt be maintained at a temperature at least 150° F. above the liquidus to avoid crystallization problems and consequently, lower fiberization efficiencies. It has been found that in the commercial production of E-glass fibers, fiberization efficiency is significantly reduced as the difference between HTV and liquidus (referred to as "delta") falls below approximately 150° F.

Thus, it would be desirable to take advantage of the cost benefits associated with lower boron E-glass formulations, but avoid the disadvantages of crystallization and fiberization problems. The challenge in producing such a composition is developing the right combination of oxides that yields a glass with a suitable HTV and maintains a delta of at least 150° F., while utilizing a lower amount of boron. Providing such a glass composition would be of exceptional value to the industry.

Accordingly, it is an object of the present invention to provide such a glass composition which can be used to make useful continuous fiberglass strands, which process is more economic to make, yet avoids major manufacturing problems associated with crystallization of the glass.

This and other objects of the present invention will become apparent to the skilled artisan upon a review of the following description and the claims appended thereto.

SUMMARY OF THE INVENTION

In accordance with the foregoing objective, provided by the present invention is a glass composition having a reduced amount of boron which is useful in preparing continuous fiberglass strands. The composition allows one to use a minimal amount of boron, yet provides a glass with a suitable HTV and a delta of at least 150° F. above the liquidus temperature to avoid crystallization problems. The composition is thus cost effective and practical for use in preparing E glass continuous strands.

The glass composition has an HTV of no greater than 2300° F. and a liquidus temperature of at least 150° F. less than the HTV temperature. The composition comprises the following ingredients:

| | |
|---|---|
| $SiO_2$ | 52–62 wt. % |
| $B_2O_3$ | 3.5–5.5 wt. % |
| CaO | 18–25 wt. % |
| MgO | 0.5–4 wt. % |
| $Al_2O_3$ | 10–15 wt. % |
| $Na_2O$ | 0.25–2 wt. %; |

It has been found that glass compositions employing the foregoing percentages can achieve a suitable HTV of less than 2300° F. so that the process remains energy efficient and extraordinary bushings capable of withstanding higher fiberization temperatures are not needed. Furthermore, the glass compositions within the foregoing percentages permit a difference between the HTV and liquidus temperature of at least 150° F., thereby permitting fiberization efficiency. While enjoying the foregoing benefits, the compositions also reduce batch material costs considerably, as well as the abatement requirements due to the lower amount of $B_2O_3$ contained in the glass composition.

DETAILED DESCRIPTION OF THE PREFERRED EMBODIMENTS

The glass compositions of the present invention are characterized by an amount of $B_2O_3$ which is less than that generally employed in industrial E glass compositions, yet more than that contained in the compositions that have evolved containing substantially no boron. Thus, the glass compositions of the present invention allows one to avoid the problems of fiberization efficiency and the need to use substantially higher fiberizing temperatures, which can do damage to the bushing employed. To achieve good, continuous fiberglass strands employing this lower amount of $B_2O_3$, and to have a suitable HTV of less than 2300° F. and a liquidus temperature at least 150° F. less than the HTV temperature, it has been found that the glass composition must also employ $SiO_2$, CaO, MgO, $Al_2O_3$ and $Na_2O$ within the following weight percentage ranges:

| | |
|---|---|
| $SiO_2$ | 52–62 wt. % |
| $B_2O_3$ | 3.5–5.5 wt. % |
| CaO | 18–25 wt. % |
| MgO | 0.5–4 wt. % |
| $Al_2O_3$ | 10–15 wt. % |
| $Na_2O$ | 0.25–2 wt. %; |

The reduced $B_2O_3$ content permits one to realize cost savings associated with lower batch costs and abatement requirements. At the same time, employing the foregoing glass composition allows one to also achieve the cost savings without significantly increasing the energy required for melting the glass, a reduction in fiberization efficiency, or requiring a development of new bushing technology.

While the foregoing compositions must contain the ingredients noted, other ingredients may be present in the composition of ingredients. Such impurities are generally $TiO_2$ and $Fe_2O_3$. In general, glass will contain $TiO_2$ in a range of from 0.4 to 0.6 wt. % as an impurity, and $Fe_2O_3$ in a range of from 0.2 to 0.3 wt. % as an impurity. As well, a small amount of $K_2O$ can be present as an impurity, for example, up to 0.5 wt. %. Generally, no $Li_2O$ or $F_2$ is found in the glasses of the present invention. Thus, while the glass composition described herein will relate to those ingredients important to achieving the objectives of the present invention, one of ordinary skill in the art will understand that impurities generally found in glass such as $TiO_2$ and $Fe_2O_3$ will be present in the glass to a limited extent.

In a preferred embodiment, the glass compositions of the present invention more preferably contain $SiO_2$ in an amount ranging from about 53 to 57 weight percent; an amount of $B_2O_3$ more preferably in the range of from about 4 to 5 weight percent; an amount of CaO more preferably in the range of from about 20–24 weight percent; an amount of MgO more preferably in the range of from about 1–3.5 weight percent; an amount of $Al_2O_3$ in the range of from about 12–15 weight percent; and an amount of Na2O in the range of from about 0.5–1.5 weight percent. Thus, a preferred composition would contain the following amounts of ingredients;

| | |
|---|---|
| $SiO_2$ | 53–57 wt. % |
| $B_2O_3$ | 3–5 wt. % |
| CaO | 20–24 wt. % |
| MgO | 1–3.5 wt. % |
| $Al_2O_3$ | 12–15 wt. % |
| $Na_2O$ | 0.5–1.5 wt. %. |

Most preferably, the amount of $SiO_2$ ranges from about 54–56 weight percent; the amount of $B_2O_3$ most preferably ranges from about 4.5 to 5.0 weight percent; the amount of CaO ranges from about 21–23.5 weight percent; the most preferred amount of MgO ranges from about 1.5–3 weight percent; and the most preferred amount of $Al_2O_3$ ranges from about 14–15 weight percent; and the amount of $Na_2O$ ranges from about 1.0–1.5 weight percent.

In selecting the particular ingredients for the glass composition within the foregoing ranges, the HTV realized is generally less than 2300° F. Easily, however, the glass composition can be formulated to achieve an HTV less that 2250° F., and most preferably less than 2200° F. The liquidus temperature of the glass composition is at least 150° F. less than that of the HTV temperature, to therefore provide a delta T of 150° F. Thus, the liquidus temperature is generally at least below 2150° F., more preferably less than 2100° F., and most preferably less than 2000° F. Also, it is preferred that the delta T is also greater than 160° F.

The reduction of $B_2O_3$ cannot simply be compensated for by the increase of another oxide in the glass composition. The combination of changes in the oxides is complex, and must be within the ranges discussed above. This selection must be made with an eye toward the HTV and liquidus temperature of the composition, for otherwise the advantages of the present invention are lost. Generally, selecting and mixing oxides within the ranges discussed above will provide one with a glass composition that meets the HTV, liquidus and delta requirements for economically and efficiently preparing continuous fiberglass strands.

In order to further illustrate the present invention, several experimental runs were conducted in which glass compositions were experimentally melted and tested for HTV, liquidus and chemical composition. As well, cost savings per ton as opposed to typical commercial E glass was calculated. Table 1 below sets forth the specific examples of glass compositions.

TABLE 1

Examples of glass composition and properties for lower $B_2O_3$-containing E-glass fibers

| Oxide (weight %) | A | B | C | D |
|---|---|---|---|---|
| $SiO_2$ | 55.82 | 56.30 | 56.70 | 57.45 |
| $Al_2O_3$ | 13.21 | 13.20 | 13.22 | 13.21 |
| CaO | 21.56 | 21.38 | 21.87 | 21.03 |
| $B_2O_3$ | 5.24 | 4.70 | 4.24 | 3.65 |
| $Na_2O$ | 1.30 | 1.31 | 1.31 | 1.31 |
| MgO | 2.05 | 2.34 | 1.86 | 2.53 |
| $TiO_2$ | 0.54 | 0.54 | 0.53 | 0.54 |
| $Fe_2O_3$ | 0.22 | 0.22 | 0.22 | 0.23 |
| $K_2O$ | 0.03 | 0.03 | 0.03 | 0.03 |
| HTV (° F.) | 2172 | 2179 | 2195 | 2217 |
| Liquidus (° F.) | 1956 | 1988 | 1999 | 2048 |
| Delta (° F.) | 216 | 191 | 196 | 169 |
| Cost savings/ton vs. E-glass | $6.0 | $9.8 | $14.2 | $18.0 |

It is clear from these experiments that in order to reduce the $B_2O_3$ concentration in the glass formulation, it cannot only be substituted for by a single oxide (e.g., 3% $B_2O_3$ vs. 3% $SiO_2$). In order to maintain the required HTV and liquidus temperature, a combination of oxides must replace $B_2O_3$ in the composition. Also, as the HTV increases over that of standard E-glass which is common for those compositions of the prior art which contain substantially no $B_2O_3$, and the same bushings are used for fiberization, bushing lifetime decreases and therefore adds costs that are not factored into the cost savings listed in Table 1, which savings are realized with the compositions of the present invention.

Other examples of suitable compositions within the present invention which provide the advantages of a suitable HTV and a delta T are shown below in Table 2.

TABLE 2

| Example | SiO$_2$ | Al$_2$O$_3$ | B$_2$O$_3$ | Na$_2$O | CaO | MgO | HTV ° F. | Liq. ° F. | Delta T |
|---|---|---|---|---|---|---|---|---|---|
| 1 | 53.35 | 14.27 | 5.50 | 1.43 | 22.82 | 1.78 | 2133.4 | 1983.4 | 150 |
| 2 | 60.61 | 11.87 | 4.5 | 0.25 | 18.63 | 3.29 | 2288.0 | 2130.6 | 157.4 |
| 3 | 58.45 | 15.00 | 5.00 | 1.74 | 18.32 | 0.64 | 2289.9 | 1936.1 | 353.8 |
| 4 | 58.07 | 15.00 | 5.00 | 1.59 | 18.70 | 0.80 | 2282.5 | 1923.7 | 358.8 |
| 5 | 60.29 | 11.61 | 5.50 | 0.25 | 18.40 | 3.10 | 2300.0 | 2150.0 | 150 |
| 6 | 60.72 | 11.96 | 4.25 | 0.25 | 18.73 | 3.24 | 2290.4 | 2120.1 | 170.3 |
| 7 | 58.00 | 13.66 | 4.75 | 2.00 | 18.17 | 2.57 | 2259.6 | 2054.2 | 205.4 |
| 8 | 54.34 | 15.00 | 4.00 | 0.25 | 24.99 | 0.57 | 2256.0 | 2106.0 | 150.0 |
| 9 | 58.00 | 13.66 | 4.75 | 2.0 | 18.17 | 2.57 | 2259.6 | 2054.2 | 205.4 |
| 10 | 57.39 | 14.92 | 3.75 | 2.0 | 18.64 | 2.45 | 2298.2 | 2117.3 | 180.9 |
| 11 | 58.87 | 14.55 | 3.50 | 1.60 | 20.13 | 0.50 | 2293.7 | 2029.0 | 264.7 |
| 12 | 57.97 | 13.77 | 5.25 | 0.5 | 18.00 | 3.66 | 2232.7 | 2082.7 | 150.0 |

While the present invention has been described in accordance with certain preferred embodiments, it will be apparent to one of ordinary skill in the art that many changes and modification can be made thereto without departing from the spirit or scope of the invention as set forth herein.

What is claimed is:

1. A glass composition useful in preparing fiberglass, comprising:

| | |
|---|---|
| SiO$_2$ | 52–62 wt. % |
| B$_2$O$_3$ | 3.5–5.5 wt. % |
| CaO | 18–25 wt. % |
| MgO | 0.5–4 wt. % |
| Al$_2$O$_3$ | 10–15 wt. % |
| Na$_2$O | 0.25–2 wt. %; | and wherein the glass composition has an HTV of no greater than 2300° F. and a liquidus temperature at least 150° F. less than the HTV temperature.

2. The glass composition of claim 1, wherein the amount of SiO$_2$ ranges from 53 to 57 wt. %.

3. The glass composition of claim 2, wherein the amount of B$_2$O$_3$ ranges from 4 to 5 wt. %.

4. The glass composition of claim 1, wherein the amount of CaO ranges from 20–24 wt. %.

5. The glass composition of claim 1, wherein the amount of MgO ranges from 1–3.5 wt. %.

6. The glass composition of claim 1 wherein the amount of Al$_2$O$_3$ ranges from 12–15 wt. %.

7. The glass composition of claim 1, wherein the amount of Na$_2$O ranges from 0.5–1.5 wt. %.

8. The glass composition of claim 1, wherein the composition contains the following amounts of ingredients:

| | |
|---|---|
| SiO$_2$ | 53–57 wt. % |
| B$_2$O$_3$ | 4–5 wt. % |
| CaO | 20–24 wt. % |
| MgO | 1–3.5 wt. % |
| Al$_2$O$_3$ | 12–15 wt. % |
| Na$_2$O | 0.5–1.5 wt. %. |

9. The glass composition of claim 8, wherein the amount of SiO$_2$ ranges from 54–56 wt. %.

10. The glass composition of claim 8, wherein the amount of CaO ranges from 21–23.5 wt. %.

11. The glass composition of claim 10, wherein the amount of MgO ranges from 1.5–3 wt. %.

12. The glass composition of claim 8, wherein the amount of Al$_2$O$_3$ ranges from 14–15 wt. %.

13. The glass composition of claim 1, wherein the HTV is less than 2250° F.

14. The glass composition of claim 1, wherein the HTV is less than 2200° F.

15. The glass composition of claim 1, wherein the liquidus temperature is at least 160° F. less than that of the HTV temperature.

16. The glass composition of claim 1, wherein the amount of B$_2$O$_3$ ranges from 4.5 to 5.0 wt. %.

* * * * *